United States Patent
Yamamoto

(10) Patent No.: US 7,309,856 B2
(45) Date of Patent: Dec. 18, 2007

(54) ELECTRONIC APPARATUS WITH LIGHT-SHIELDING PLATE INTERPOSED BETWEEN LIGHT GUIDES

(75) Inventor: Masateru Yamamoto, Echizen (JP)

(73) Assignee: Orion Electric Co., Ltd., Echizen, Fukui (JP)

( * ) Notice: Subject to any disclaimer, the term of this patent is extended or adjusted under 35 U.S.C. 154(b) by 78 days.

(21) Appl. No.: 11/378,291

(22) Filed: Mar. 20, 2006

(65) Prior Publication Data

US 2006/0214094 A1 Sep. 28, 2006

(30) Foreign Application Priority Data

Mar. 25, 2005 (JP) ............... 2005-089789

(51) Int. Cl.
H01J 5/02 (2006.01)
H01L 31/00 (2006.01)
H01H 9/00 (2006.01)

(52) U.S. Cl. ............ 250/239; 250/214.1; 200/314; 200/317

(58) Field of Classification Search ........ 250/221, 250/239, 214.1, 551, 216, 227.11; 200/308, 200/310, 313, 314, 317; 257/83; 340/555–557; 345/166, 169; 348/162, 164, 165

See application file for complete search history.

(56) References Cited

U.S. PATENT DOCUMENTS 6,878,892 B2* 4/2005 Miyako et al. ............. 200/310
7,002,087 B2* 2/2006 Miyako et al. ............. 200/310
7,026,563 B2* 4/2006 Miyako et al. ............. 200/310
2005/0252754 A1* 11/2005 Arnold ..................... 200/61.01

FOREIGN PATENT DOCUMENTS

JP 2002-110003 4/2002

\* cited by examiner

*Primary Examiner*—Que Tan Le
*Assistant Examiner*—Pascal M. Bui-Pho
(74) *Attorney, Agent, or Firm*—Westerman, Hattori, Daniels & Adrian, LLP.

(57) ABSTRACT

The present invention allows illumination light of a light source which leaks out to a light receiving element to be reliably shielded and allows components to be assembled to be unitized into a compact body. A light-shielding cylindrical section 31 and a light-shielding plate 32 interposed between a light-receiving side light guide 10 and a light emitting side light guide 11 are formed on a frame body 29 of a push button 2 as a single piece. Illumination light which leaks out from a light emitting element 6 and the light emitting side light guide 11 to a light receiving element 5 is shielded by the light-shielding cylindrical section 31 and the light-shielding plate 32. Support ribs 35 and a hook 41 for positioning a circuit substrate 7 are formed in the frame body 29, whereby the light guides 10, 11, light-shielding cylindrical section 31 and light-shielding plate 32 are unitized on the frame body 29.

7 Claims, 10 Drawing Sheets

(a)

(b)

ELECTRONIC APPARATUS WITH LIGHT-SHIELDING PLATE INTERPOSED BETWEEN LIGHT GUIDES

The present application is based on and claims priority of Japanese patent application No. 2005-089789 filed on Mar. 25, 2005, the entire contents of which are hereby incorporated by reference.

BACKGROUND OF THE INVENTION

1. Field of the Invention

The present invention relates to an electronic apparatus in which at least a light source and a light receiving element are arranged in parallel on a circuit substrate and light guides are interposed between this light source, light receiving element and a translucent panel provided on a front panel.

2. Description of the Related Art

Conventionally, a front panel of a television receiver or the like incorporates a plurality of embedded switches for processing and controlling various sections of the television receiver and is provided with a light receiving section which receives a light signal from a remote control device and a light-emitting display section which turns ON/OFF in conjunction with ON/OFF of a power supply, and when the light receiving section and light-emitting display section are made up of a single translucent panel, light guides for guiding a light signal from the remote control device and illumination light from a light source are arranged between the translucent panel and the light receiving element and between the translucent panel and the light source. Furthermore, when the light receiving element and the light source are arranged in parallel on the circuit substrate, if illumination light from the light source leaks out to the light receiving element, this may cause malfunction, and therefore it is necessary to shield the illumination directed from the light source to the light receiving element. For example, Japanese Patent Laid-Open Publication No. 2002-110003 (patent document 1) proposes a structure which is provided with a light guide for guiding illumination light and which shields light so as to prevent the illumination light from the light source from leaking out to parts other than the necessary part. This discloses a switch device provided with a circuit substrate including a panel body, a plurality of operation knobs having a translucent display section in a manner it can be pressed into this panel body, switch bodies arranged behind these operation knobs corresponding to the respective operation knobs and a light source which illuminates the display section, and a light guide disposed between this circuit substrate and the operation knobs for guiding the light from the light source to the display section, wherein the light guide extends in a direction adjacent to the respective operation knobs, the light source is placed on the side of the light guide and the perimeter of the light guide is covered with a white-color-based light-shielding cylindrical member so as to prevent the illumination light from the light guide from leaking out to at least parts other than the area corresponding to the display section.

The switch device described in the patent document 1 arranges a common continuous light guide in correspondence with a plurality of adjacent operation knobs, covers the perimeter of the light guide with the light-shielding cylindrical member except for the area which corresponds to the display section of the operation knobs to thereby shield illumination light which leaks out to the neighboring display section using the light-shielding cylindrical member. However, in the switch device shown in the patent document 1, all illumination light guided by the light guide is oriented toward the same direction, and therefore the light-shielding cylindrical member which covers the light guide has a relatively simple shape, but as described above, when the light receiving element and the light source for illumination display are mounted on the circuit substrate, the orientations of illumination light beams guided by the respective light guides arranged between the translucent panel and light source provided on the front panel are opposite to each other. That is, since the receiving side light guide placed between the translucent panel and the light receiving element guides the light signal from the remote control apparatus to the light receiving element, the light signal guided by the receiving side light guide is oriented from the translucent panel toward the light receiving element, while since the light emitting side light guide placed between the light source and the translucent panel guides illumination light from the light source to the translucent panel, the illumination light guided by the light emitting side light guide is oriented from the light source toward the translucent panel, and therefore it is not possible to use a simple light-shielding cylindrical member as described in the patent document 1 and its shape is more complicated. Moreover, the switch device described in the patent document 1 consists of the operation knobs, light guide and circuit substrate individually attached to the housing, which involves many parts to be assembled and requires complicated assembly work.

SUMMARY OF THE INVENTION

The present invention has been implemented in view of the above described problems and it is an object of the present invention to provide an electronic apparatus capable of reliably shielding illumination light of a light source which leaks out to a light receiving element, unitizing a plurality of components into a compact body, reducing the number of parts and thereby improving the efficiency of the assembly work.

The electronic apparatus according to a first aspect of the present invention is an electronic apparatus comprising a circuit substrate provided with at least a switch and a light receiving element which receives a light signal from a light source and a remote control device, arranged in parallel and a housing which houses the circuit substrate, a front panel of which is provided with a translucent panel facing the light receiving element and light source, a push button which pushes and operates the switch, the housing further including a light emitting side light guide which guides illumination light from the light source to the translucent panel and a light receiving side light guide which guides a light signal transmitted from the remote control signal to the light receiving element arranged in parallel, the light emitting side light guide and the light receiving side light guide connected as a single piece by means of a connecting member, wherein a light-shielding cylindrical section disposed between the push button and the translucent panel, which covers the perimeter of the light emitting side light guide is formed on the front side of the push button, and a light-shielding plate interposed between the light emitting side light guide and the light receiving side light guide is formed on the back side of the push button as a single piece.

According to the construction of the first aspect of the present invention, the light receiving element and the light emitting element as the light source mounted on the circuit substrate face the ends of the light emitting side light guide and the light receiving side light guide, a light signal from the remote control device is guided by the light receiving side light guide to the light receiving element, while illumination light irradiated from the light emitting element is guided by the light emitting side light guide to the translucent panel. In this case, the outer surface of the light emitting side light guide on the end side is covered with the light-shielding cylindrical section and the light-shielding plate is interposed between the light receiving side light guide and light emitting side light guide on the base side of the light emitting side light guide, which shields illumination light irradiated from the light emitting element.

The electronic apparatus according to a second aspect of the present invention is the electronic apparatus according to the first aspect of the present invention, wherein the push button comprises a button member provided with an operation section which protrudes from the front panel and a switch pressing section which protrudes backward from the operation section for pressing the switch, a frame body which supports the button member through a flexible hinge section and a stopper formed on the frame body as a single piece at a predetermined distance from the button member, and the light-shielding cylindrical section and light-shielding plate are formed on the frame body as a single piece.

According to the construction of the second aspect of the present invention, the switch pressing sections of the frame body face the switches mounted on the circuit substrate and pressing the operation section which protrudes from the front panel causes the button member to fall inward from the hinge section, causing the switch pressing section to control ON/OFF of the switch. In this case, the button member touches the stopper, thus preventing the switch pressing section from pressing the switch excessively. Furthermore, the light-shielding cylindrical section and light-shielding plate are unitized on the frame body of the push button.

The electronic apparatus according to a third aspect of the present invention is the electronic apparatus according to the second aspect of the present invention, wherein means for positioning the circuit substrate is formed on the frame body.

According to the construction of the third aspect of the present invention, the circuit substrate is attached to the frame body using the positioning means, which allows the circuit substrate to be attached to the frame body of the push button as a single piece, thus realizing unitization.

The electronic apparatus according to a fourth aspect of the present invention is the electronic apparatus according to the third aspect of the present invention, wherein support ribs which protrude from the back of the frame body are formed in parallel to the light-shielding plate, notch grooves into which the circuit substrate is inserted are formed in the light-shielding plate and the support ribs, a flexible hook to be engaged with the circuit substrate is formed on the back of the frame body as a single piece and the positioning means is constructed of the hook and the notch grooves.

According to the construction of the fourth aspect of the present invention, the circuit substrate is inserted into the notch grooves formed in the light-shielding plate and support ribs formed on the back of the frame body and engaged with the flexible hook which protrudes from the back of the frame body, whereby the frame body and circuit substrate are unitized into a single unit.

The electronic apparatus according to a fifth aspect of the present invention is the electronic apparatus according to any one of the second to fourth aspects of the present invention, wherein positioning holes are formed in the frame body and the connecting member and positioning pins to be inserted into the positioning holes are formed in the housing so as to protrude from the housing.

According to the construction of the fifth aspect of the present invention, by inserting the positioning pins formed on the housing into the positioning holes formed in the frame body and connecting member of the light guides, it is possible to position the frame body of the push button, light receiving side light guide, light emitting side light guide and circuit substrate in the housing.

BRIEF DESCRIPTION OF THE DRAWINGS

FIG. 1(a) showing a perspective view viewed from the front, FIG. 1(b) showing a perspective view viewed from the back;

FIG. 3(a) showing the frame body detached from the light guide viewed from the front and FIG. 3(b) showing the light guide coupled with the frame body;

DETAILED DESCRIPTION OF THE PREFERRED EMBODIMENTS

An embodiment as the best mode for implementing the present invention will be explained below with reference to FIG. 1 to FIG. 10. However, it goes without saying that the present invention is also easily applicable to structures other than that explained in the embodiment within a range not departing from the essence of the present invention.

Figure 1:
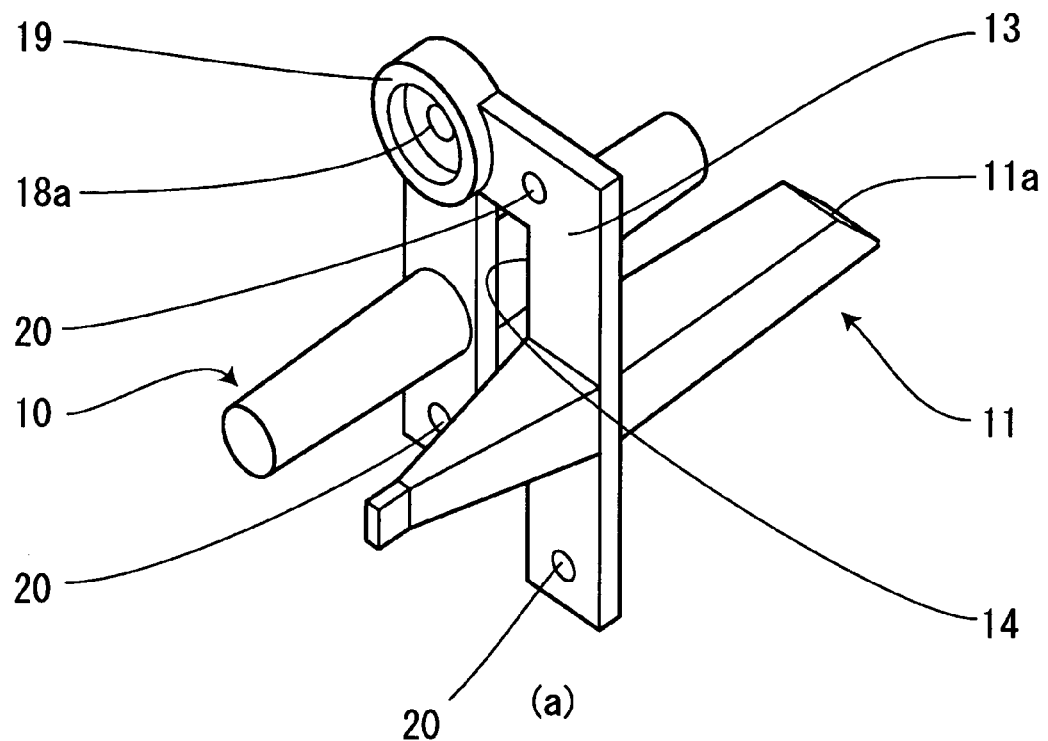
FIG. 1 is a perspective view of a light guide showing an embodiment of the present invention.
Figure 1:
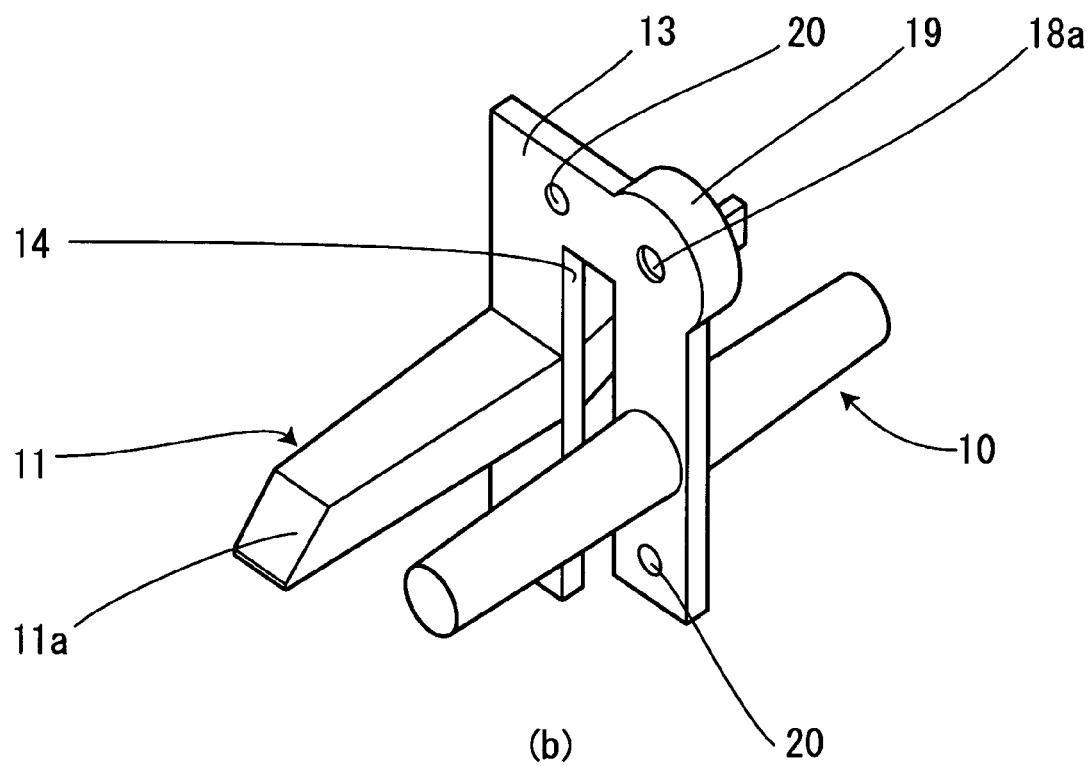
Figure 2:
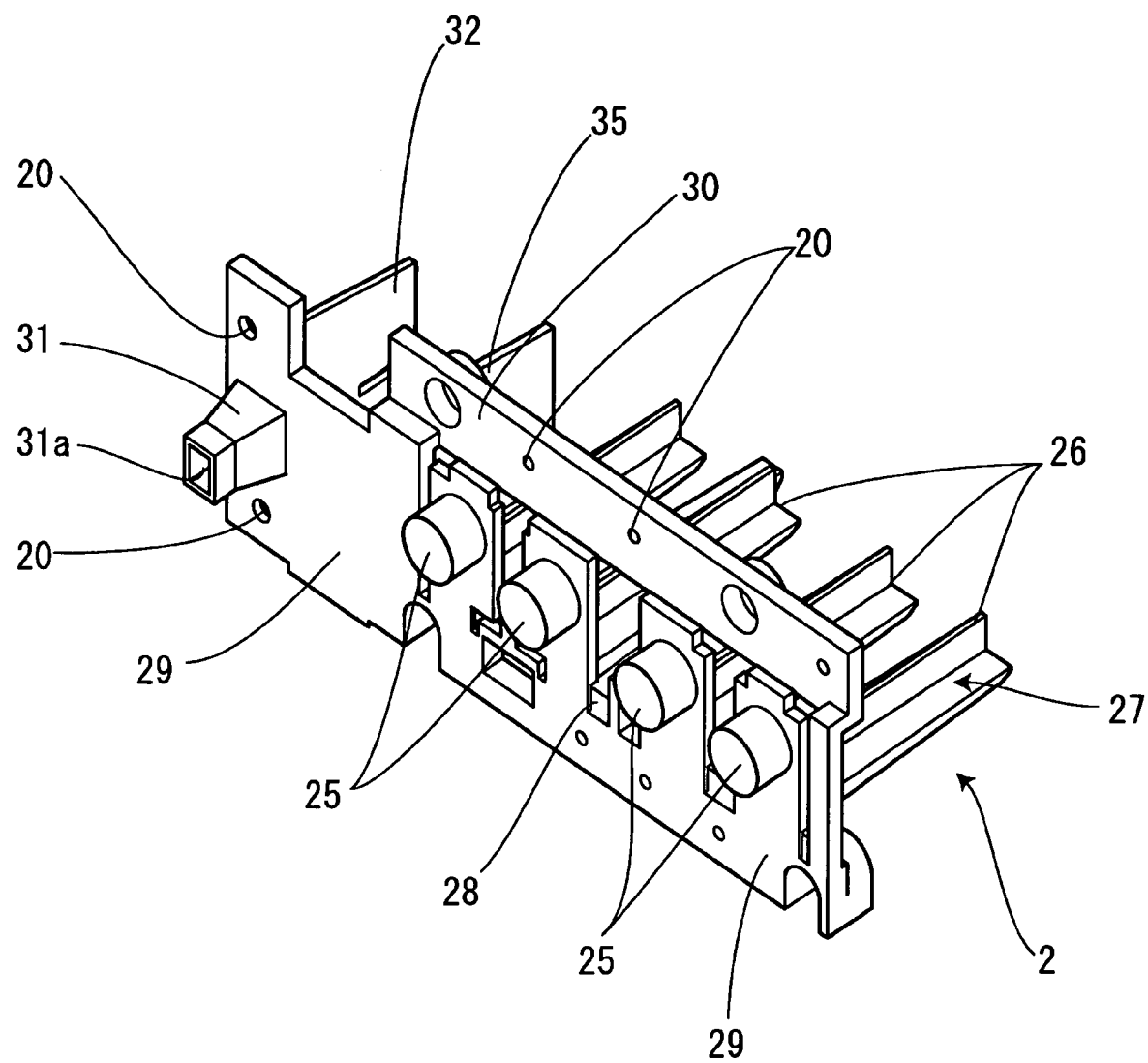
FIG. 2 is a perspective view of push buttons according to the embodiment of the present invention viewed from the front.
Figure 3:
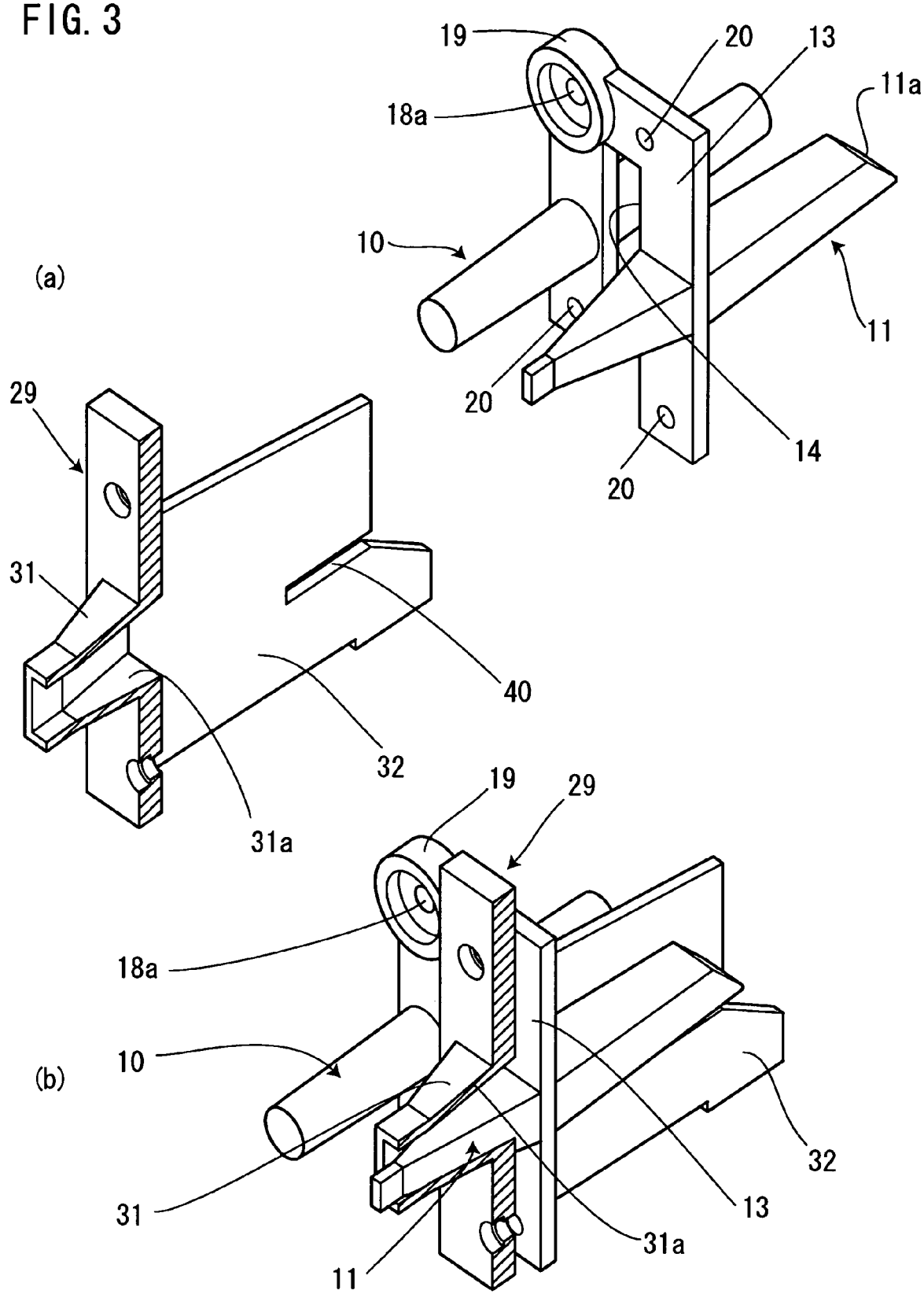
FIG. 3 is a perspective view showing an assembly state of the frame body and the light guide according to the embodiment of the present invention, with the frame body being notched.
Figure 4:
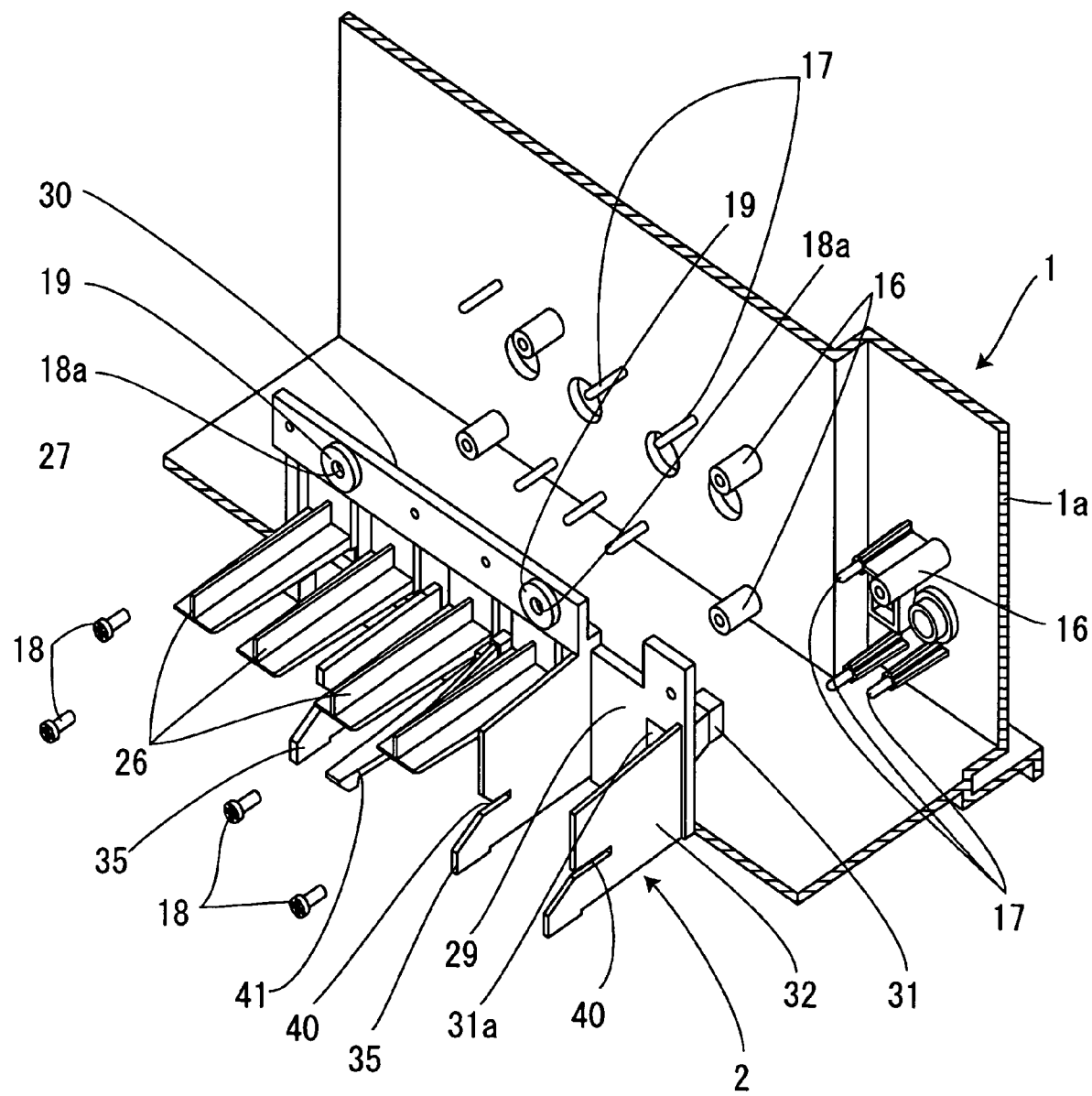
FIG. 4 is an exploded perspective view of the housing and push buttons according to the embodiment of the present invention.
Figure 5:
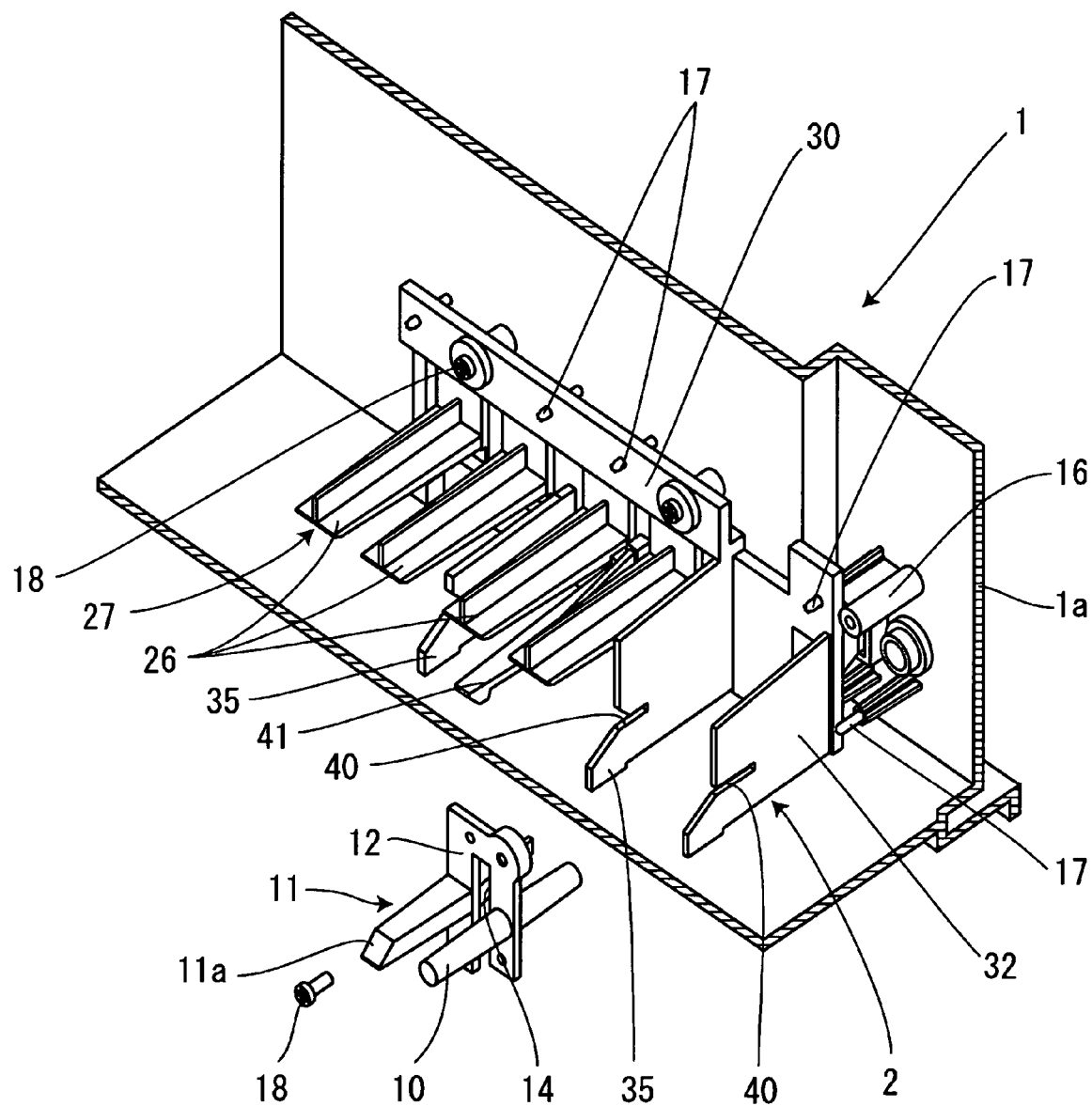
FIG. 5 is a perspective view of the push buttons attached to the housing with the light guide detached from the frame body according to the embodiment of the present invention.
Figure 6:
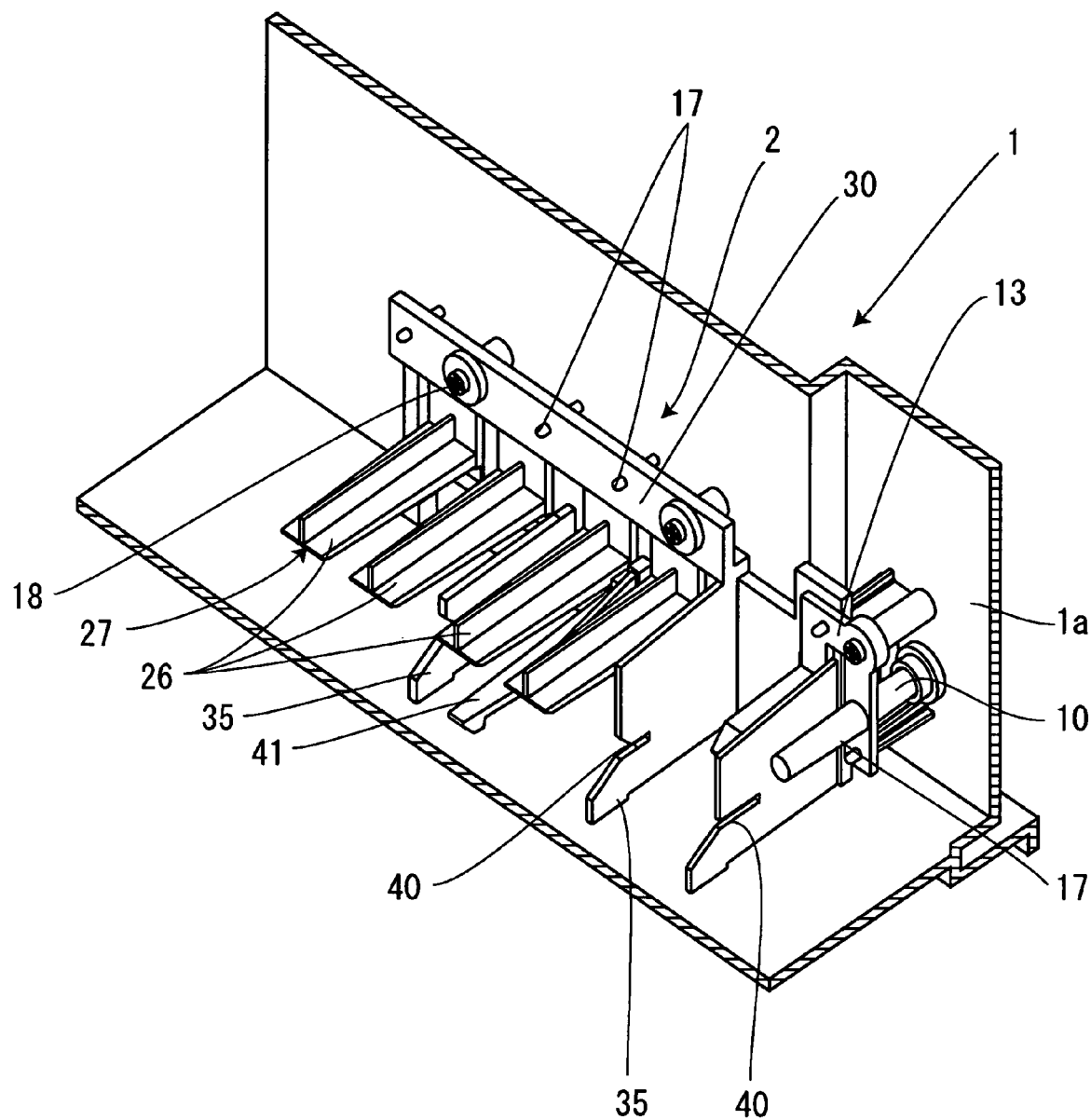
FIG. 6 is a perspective view of the frame body and the light guide according to the embodiment of the present invention attached to the housing.
Figure 7:
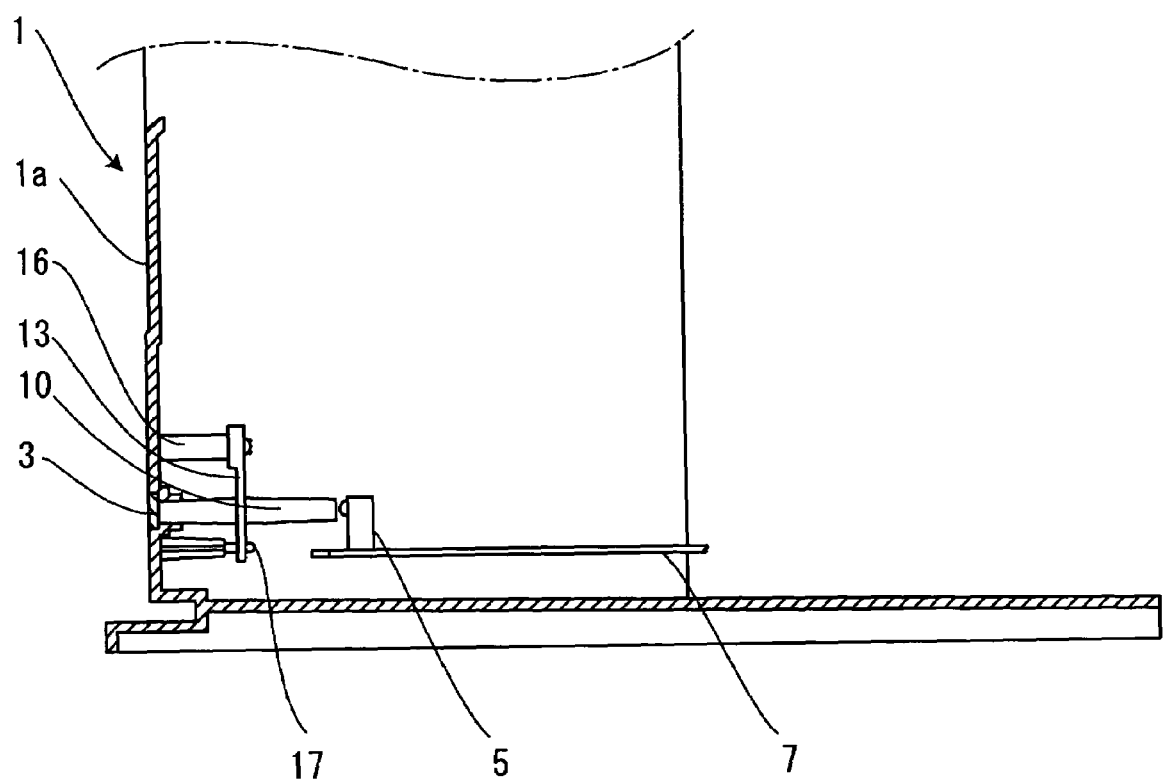
FIG. 7 is a section view showing an assembly state of the push button, circuit substrate and light guide according to the embodiment of the present invention, which is cut away in the vicinity of the light receiving element.
Figure 8:
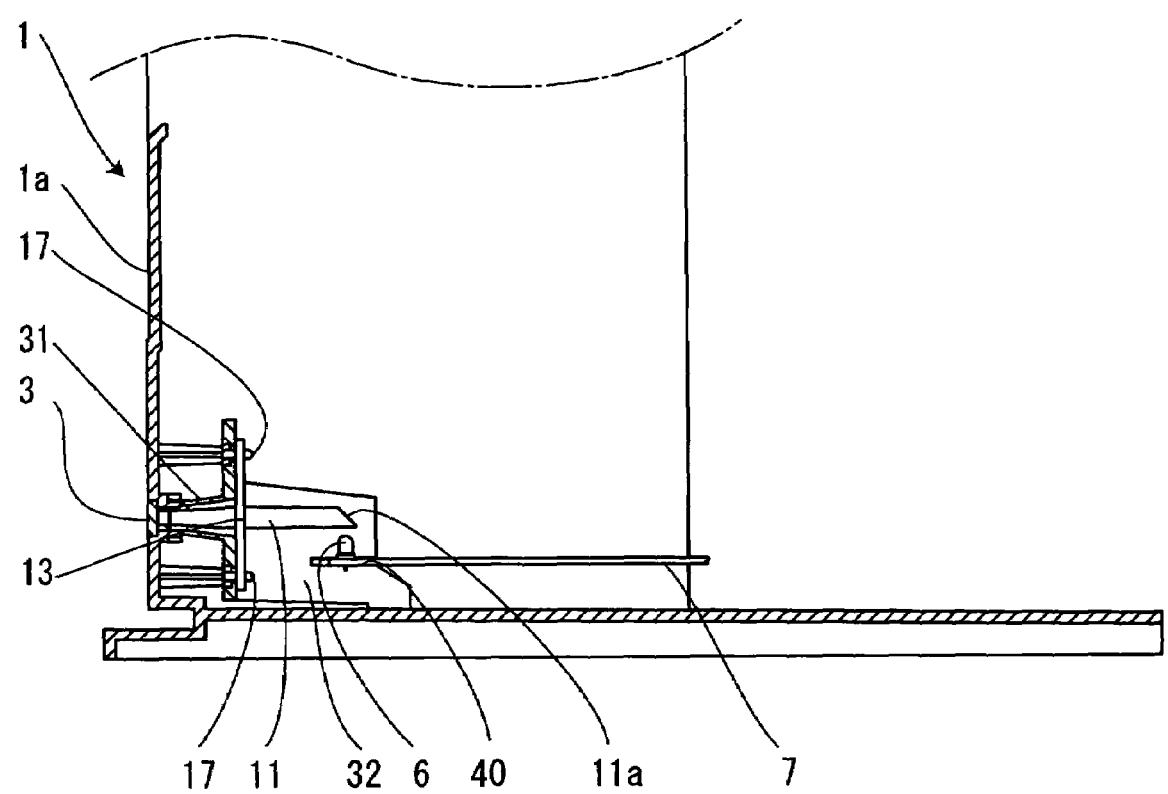
FIG. 8 is a section view showing an assembly state of the push button, circuit substrate and light guide according to the embodiment of the present invention, which is cut away in the vicinity of the light emitting element.
Figure 9:
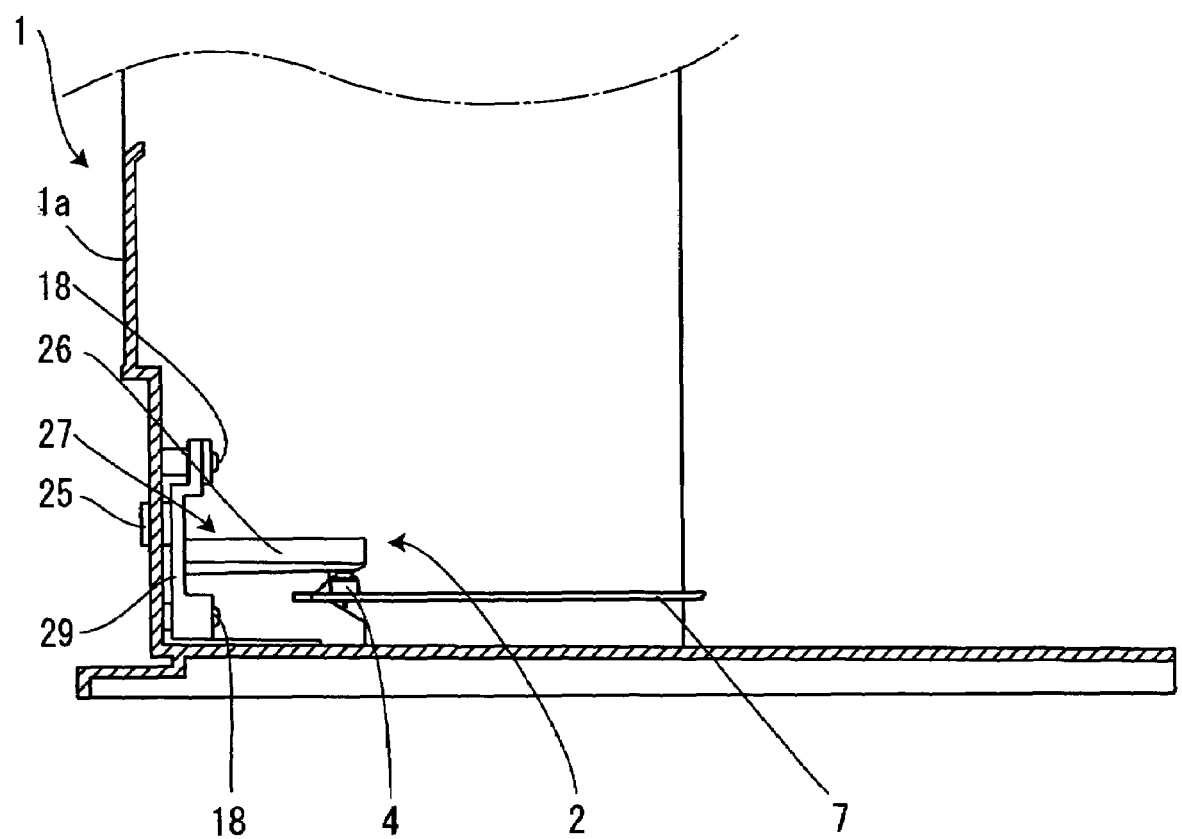
FIG. 9 is a section view showing an assembly state of the push button, circuit substrate and light guide according to the embodiment of the present invention, which is cut away in the vicinity of the switch.

FIG. 1 to FIG. 10 show an embodiment of the present invention, FIG. 1 is a perspective view of a light guide, FIG. 2 is a perspective view of push buttons, FIG. 3 is a perspective view showing an assembly state of the frame body and the light guide, FIG. 4 is an exploded perspective view of the housing and push buttons, FIG. 5 is an exploded perspective view of the housing to which the frame body is attached and the light guide, FIG. 6 is a perspective view showing the frame body and the light guide assembled attached to the housing, and FIG. 7 to FIG. 9 are section views showing an assembly state of the push button, circuit substrate and light guide. In these figures, reference numeral 1 denotes a housing of an electronic apparatus such as a television receiver and a plurality of buttons 2 for selecting and switching between various sections of the television receiver and a translucent panel 3 which allows a light signal from a remote control apparatus (not shown) and illumination light of a light source which is provided inside the housing 1 to pass, which will be described later, are arranged in parallel on a front panel 1*a* of this housing 1. The housing 1 also incorporates a circuit substrate 7 mounted with a plurality of switches 4 which correspond to their respective buttons 2, a light receiving element 5 which receives a light signal from the remote control device and controls ON/OFF of a main power supply of, for example, a television receiver and a light emitting element 6 as a light source which turns ON or OFF in conjunction with ON/OFF of the main power supply. A light guide 10 (hereinafter referred to as "light receiving side light guide") which guides a light signal from the remote control device to the light receiving element 5 and a light guide 11 (hereinafter referred to as "light emitting side light guide") which guides illumination light irradiated from the light emitting element 6 to the translucent panel 3 are arranged between the light receiving element 5, the light emitting element 6 and the translucent panel 3. The light guides 10, 11 are made of a translucent plastic molded body and connected by a substantially flat connecting member 13 as a single piece such that they are arranged in parallel separated by a space corresponding to the distance between the light receiving element 5 and light emitting element 6 mounted on the circuit substrate 7. Furthermore, the light receiving side light guide 10 is substantially formed like a column, while the light emitting side light guide 11 is formed like a prism as a whole, a slope 11*a* is formed at its base end part located on the light emitting element 6 side to reflect illumination light of the light emitting element 6 toward the end, the end of the light emitting side light guide 11 is formed like a pyramid with the connecting member 13 as a boundary and its portion closest to the end is molded into a thin plate shape. Furthermore, a U-shaped notch 14 is formed in the connecting member 13 to avoid a light-shielding plate which will be described later and a cylindrical section 19 having an insertion hole 18*a* for a screw 18 and positioning holes 20 are formed in correspondence with boss sections 16 and positioning pins 17 formed on the inner surface of the front panel 1*a*.

The push button 2 is constructed of operation sections 25 which protrude from the front panel 1*a*, button members 27 provided with a pressing section 26 which protrudes backward from the operation section 25 and presses the switch 4 mounted on the circuit substrate 7, a frame body 29 which supports the button members 27 through a thin-walled flexible hinge section 28 and a stopper 30 integrated with the frame body 29 at a predetermined distance from the button members 27. That is, the button member 27 made up of the operation section 25 and switch pressing section 26 is supported by the frame body 29 in a cantilevered form through the hinge section 28 and the stopper 30 is formed in a stepped shape from the top end of the frame body 29 as a single piece so as to keep a predetermined distance from the free end of the button member 27. Moreover, the side end of the frame body 29 extends to substantially the middle of the light receiving side light guide 10 and light emitting side light guide 11, an opening window 31*a* into which the light emitting side light guide 11 is inserted is formed close to the side end of the frame body 29, a prismoid-shaped light-shielding cylindrical section 31 which covers the outer edge of the light emitting side light guide 11 is formed from the outer edge of this opening window 31*a* toward the translucent panel 3 and a light-shielding plate 32 to be interposed between the light receiving side light guide 10 and light emitting side light guide 11 is formed as a single piece from the side edge of the frame body 29 toward the circuit substrate 7. Furthermore, a plurality of support ribs 35 protrude from the back of the frame body 29 parallel to the light-shielding plate 32 and a plurality of notch grooves 40 whereby the circuit substrate 7 is inserted into the light-shielding plate 32 and support ribs 35 are formed respectively. Furthermore, a flexible hook 41 to be engaged with a locking hole (not shown) of the circuit substrate 7 is formed on the back of the frame body 29 as a single piece so that the circuit substrate 7 inserted into the notch grooves 40 formed in the support ribs 35 and light-shielding plate 32 is positioned and held by this hook 41. Furthermore, cylindrical sections 19 having the insertion hole 18*a* for the screw 18 and positioning holes 20 are formed in the frame body 29 in correspondence with the boss sections 16 and positioning pins 17 formed on the inner surface of the front panel 1*a* as in the case of the connecting member 13.

In this embodiment constructed as shown above, as shown in FIG. 4, the cylindrical sections 19 and positioning holes 20 formed in the frame body 29 of the push button 2 are engaged with the boss sections 16 and positioning pins 17 formed on the inner surface of the front panel 1*a* and the frame body 29 of the push button 2 is positioned on the inner surface of the front panel 1*a* first. This causes the operation sections 25 of the push button 2 to protrude from the front panel 1*a*. After positioning the frame body 29 of the push button 2 on the inner surface of the front panel 1*a* in this way, the connecting member 13 which unites the light guides 10, 11 is superimposed on the frame body 29 as shown in FIG. 5 and the cylindrical sections 19 and positioning holes 20 formed in the connecting member 13 are engaged with the boss sections 16 and positioning pins 17 formed on the inner surface of the front panel 1*a* as in the case of the push button 2. In this case, the outer surface of the light emitting side light guide 11 on the end side is covered with the light-shielding cylindrical section 31 formed on the perimeter of the opening window 31*a* formed on the frame body 29 and the light-shielding plate 32 formed on the frame body 29 as a single piece is interposed between the light receiving side light guide 10 and light emitting side light guide 11 on the base side of the light emitting side light guide 11. Next, the screws 18 are screwed from the insertion holes 18*a* formed in the connecting member 13 and frame body 29 into the boss sections 16 to thereby fix the light guides 10, 11 and frame body 29 to the front panel 1*a*. Next, the circuit substrate 7 is inserted into the notch grooves 40 formed in the support ribs 35 and light-shielding plate 32 formed as a single piece on the back of the frame body 29 and the hook 41 formed on the frame body 29 is engaged with the circuit substrate 7 to thereby position and hold the circuit substrate 7. This causes the light receiving element 5 and light emitting element 6 mounted on the circuit substrate 7 to face the ends of the light guides 10, 11, causes a light signal from the remote control device to be guided by the light receiving side light guide 10 to the light receiving element 5 and causes illumination light irradiated from the light emitting element 6 to be guided by the light emitting side light guide 11 to the translucent panel 3. In this case, since the outer surface of the light emitting side light guide 11 on the end side is covered with the light-shielding cylindrical section 31 of the frame body 29 and the light-shielding plate 32 is interposed between the light receiving side light guide 10 and light emitting side light guide 11 on the base side of the light emitting side light guide 11, it is possible to prevent illumination light irradiated from the light emitting element 6 from leaking out to the light receiving element 5, causing misoperation or the like and reliably shield illumination light irradiated from the light emitting element 6. Furthermore, the switch pressing sections 26 of the frame body 29 face the switches 4 mounted on the circuit substrate 7 and pressing the operation section 25 which protrudes from the front panel 1a causes the button member 27 to fall inward from the hinge section 28, causing the switch pressing section 26 to control ON/OFF of the switch 4. In this case, the button member 27 touches the stopper 30, thus preventing the switch pressing section 26 from pressing the switch 4 excessively.

Figure 10:
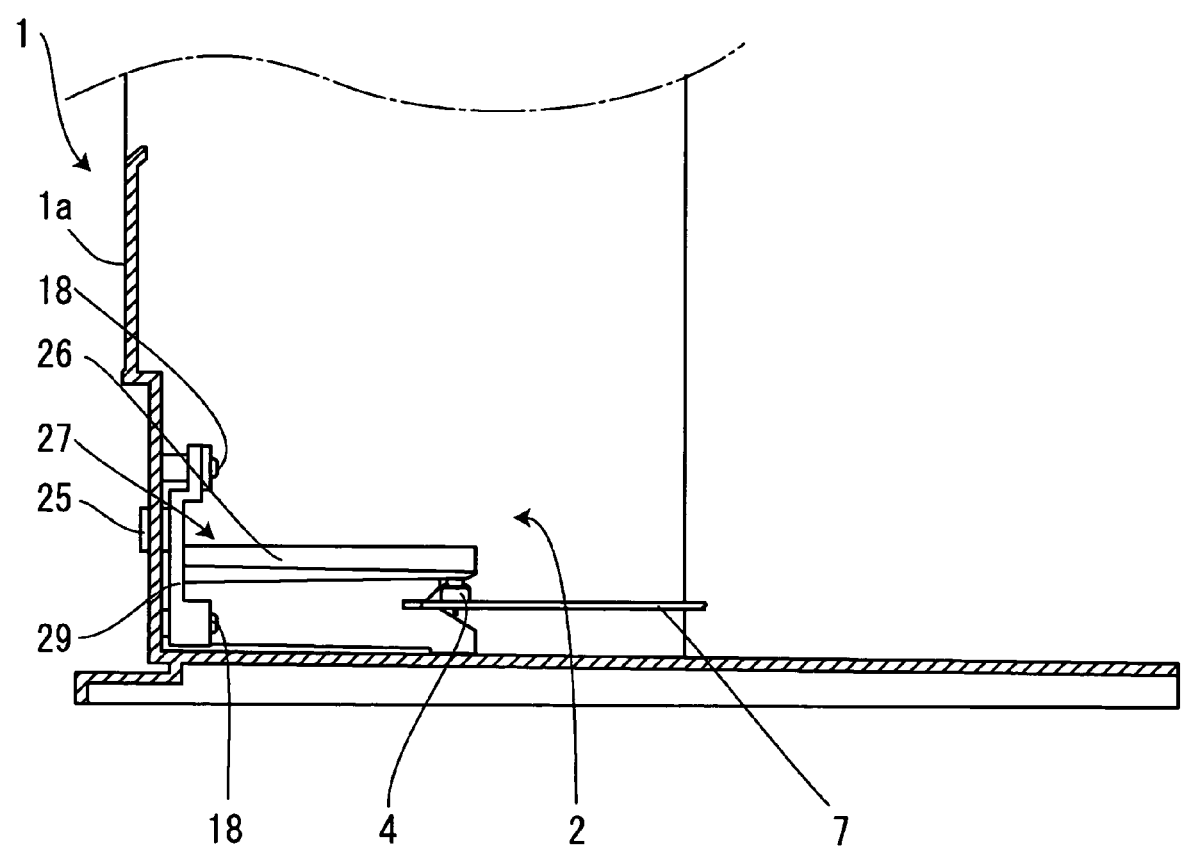
FIG. 10 is a section view showing an assembly state of the push button, circuit substrate and light guide according to the embodiment of the present invention, which is cut away in the vicinity of the switch when the layout of the circuit substrate is changed.

As described above, according to this embodiment, the light-shielding cylindrical section 31 which covers the outer surface of the light emitting side light guide 11 which guides illumination light irradiated from the light emitting element 6 to the translucent panel 3 and the light-shielding plate 32 interposed between the light receiving side light guide 10 and light emitting side light guide 11 are formed on the frame body 29 of the push button 2 as a single piece and this light-shielding cylindrical section 31 and light-shielding plate 32 can reliably shield illumination light which leaks out from the light emitting element 6 and light emitting side light guide 11 to the light receiving element 5. Since the light-shielding cylindrical section 31 and light-shielding plate 32 which shield illumination light leaking out from the light emitting side light guide 11 are formed on the frame body 29 of the push button 2 in this way, when, for example, the positions of the light receiving element 5 and light emitting element 6 mounted on the circuit substrate 7 are changed, if the length of the connecting member 13 which unites the light receiving side light guide 10 and light emitting side light guide 11 is changed according to the interval, it is possible to achieve commonality of the frame body 29 of the push button 2 including the light-shielding cylindrical section 31 and light-shielding plate 32. Moreover, since the light receiving side light guide 10 and light emitting side light guide 11 in their entirety need not be covered, it is also possible to simplify the shapes of the light-shielding cylindrical section 31 and light-shielding plate 32. Furthermore, the light-shielding cylindrical section 31 and light-shielding plate 32 are formed on the frame body 29 of the push button 2 as a single piece, the support ribs 35 and hook 41 for positioning the circuit substrate 7 are formed on the frame body 29 and the light-shielding plate 32 also serves as the positioning means for positioning the circuit substrate 7, and therefore it is possible to drastically reduce the number of parts assembled and provide excellent assembly operability compared to the case where these components are molded as separate bodies. Furthermore, by engaging the cylindrical sections 19 and positioning holes 20 formed in the connecting member 13 which unites the frame body 29 of the push button 2 and light guides 10, 11 with the boss sections 16 and positioning pins 17 formed on the inner surface of the front panel 1a, it is possible to simply position the frame body 29 and the light guides 10, 11 on the front panel 1a and by attaching the circuit substrate 7 to the frame body 29 attached to the front panel 1a in this way, even when, for example, the layout such as the arrangement of the circuit substrate 7 in the housing 1 is changed as shown in FIG. 10, if the frame body 29 corresponding to the layout of the circuit substrate 7 is provided separately, it is possible to achieve commonality of the housing 1 and adapt to a change in the positions of the light receiving element 5 and light emitting element 6 mounted on the aforementioned circuit substrate 7, which provides excellent compatibility.

An embodiment of the present invention has been explained in detail so far, but the present invention is not limited to this embodiment and can be modified in various ways within a range not departing from the essence of the present invention. For example, the embodiment has explained the television receiver as an example of the electronic apparatus, but the present invention is not limited to this and is also applicable to various types of electronic apparatus. Furthermore, the shapes of the components, positioning means or the fixing structure of the frame body are not limited to the embodiment either and can be selected as appropriate.

The effects of the present invention are as follows.

The electronic apparatus according to the first aspect of the present invention is an electronic apparatus comprising a circuit substrate provided with at least a switch and a light receiving element which receives a light signal from a light source and a remote control device, arranged in parallel and a housing which houses the circuit substrate, a front panel of which is provided with a translucent panel facing the light receiving element and light source, a push button which pushes and operates the switch, the housing further including a light emitting side light guide which guides illumination light from the light source to the translucent panel and a light receiving side light guide which guides a light signal transmitted from the remote control signal to the light receiving element arranged in parallel, the light emitting side light guide and the light receiving side light guide connected as a single piece by means of a connecting member, wherein a light-shielding cylindrical section disposed between the push button and the translucent panel, which covers the perimeter of the light emitting side light guide is formed on the front side of the push button, and a light-shielding plate interposed between the light emitting side light guide and the light receiving side light guide is formed on the back side of the push button as a single piece, and therefore it is possible to reliably shield illumination light leaking out from the light emitting element as the light source and light emitting side light guide to the light receiving element using the light-shielding cylindrical section and light-shielding plate formed on the push button.

The electronic apparatus according to the second aspect of the present invention is the electronic apparatus according to the first aspect of the present invention, wherein the push button comprises a button member provided with an operation section which protrudes from the front panel and a switch pressing section which protrudes backward from the operation section for pressing the switch, a frame body which supports the button member through a flexible hinge section and a stopper formed on the frame body as a single piece at a predetermined distance from the button member, and the light-shielding cylindrical section and light-shielding plate are formed on the frame body as a single piece, and therefore the light-shielding cylindrical section and light-shielding plate are unitized on the frame body of the push button, making it possible to reduce the number of parts assembled and improve the efficiency of assembly work.

The electronic apparatus according to the third aspect of the present invention is the electronic apparatus according to the second aspect of the present invention, wherein means for positioning the circuit substrate is formed on the frame body, and therefore it is possible to further unitize the circuit substrate with the frame body and further improve the efficiency of assembly work.

The electronic apparatus according to the fourth aspect of the present invention is the electronic apparatus according to the third aspect of the present invention, wherein support ribs which protrude from the back of the frame body are formed in parallel to the light-shielding plate, notch grooves into which the circuit substrate is inserted are formed in the light-shielding plate and the support ribs, a flexible hook to be engaged with the circuit substrate is formed on the back of the frame body as a single piece and the positioning means is constructed of the hook and the notch grooves, and therefore by inserting the circuit substrate into the notch grooves formed in the light-shielding plate and support ribs formed on the back of the frame body, it is possible to simply fix the circuit substrate with the hook.

The electronic apparatus according to the fifth aspect of the present invention is the electronic apparatus according to any one of the second to fourth aspects of the present invention, wherein positioning holes are formed in the frame body and the connecting member and positioning pins to be inserted into the positioning holes are formed in the housing so as to protrude from the housing, and therefore by only inserting the positioning pins formed on the housing into the positioning holes formed in the frame body and connecting member of the light guides, it is possible to accurately and simply position the frame body of the push button, light receiving side light guide, light emitting side light guide and circuit substrate in the housing.

What is claimed is:

1. An electronic apparatus comprising:
a circuit substrate provided with at least a switch and a light receiving element which receives a light signal from a light source and a remote control device, arranged in parallel; and
a housing which houses the circuit substrate, a front panel of which is provided with a translucent panel facing the light receiving element and light source, a push button which pushes and operates the switch, the housing further including a light emitting side light guide which guides illumination light from the light source to the translucent panel and a light receiving side light guide which guides a light signal transmitted from the remote control signal to the light receiving element arranged in parallel, the light emitting side light guide and the light receiving side light guide connected as a single piece by means of a connecting member,
wherein a light-shielding cylindrical section, disposed between the push button and the translucent panel and on the front side of the push button, covers the perimeter of the light emitting side light guide, and wherein a light-shielding plate, interposed between the light emitting side light guide and the light receiving side light guide, is formed on the back side of the push button as a single piece.

2. The electronic apparatus according to claim 1, wherein the push button comprises a button member provided with an operation section which protrudes from the front panel and a switch pressing section which protrudes backward from the operation section for pressing the switch, a frame body which supports the button member through a flexible hinge section and a stopper formed on the frame body as a single piece at a predetermined distance from the button member, and the light-shielding cylindrical section and light-shielding plate are formed on the frame body as a single piece.

3. The electronic apparatus according to claim 2, wherein means for positioning the circuit substrate is formed on the frame body.

4. The electronic apparatus according to claim 3, wherein support ribs which protrude from the back of the frame body are formed in parallel to the light-shielding plate, notch grooves into which the circuit substrate is inserted are formed in the light-shielding plate and the support ribs, a flexible hook to be engaged with the circuit substrate is formed on the back of the frame body as a single piece and the positioning means is constructed of the hook and the notch grooves.

5. The electronic apparatus according to claim 2, wherein positioning holes are formed in the frame body and the connecting member and positioning pins to be inserted into the positioning holes are formed in the housing so as to protrude from the housing.

6. The electronic apparatus according to claim 3, wherein positioning holes are formed in the frame body and the connecting member and positioning pins to be inserted into the positioning holes are formed in the housing so as to protrude from the housing.

7. The electronic apparatus according to claim 4, wherein positioning holes are formed in the frame body and the connecting member and positioning pins to be inserted into the positioning holes are formed in the housing so as to protrude from the housing.

* * * * *